United States Patent [19]

Schwartz, Jr.

[11] 4,038,342
[45] July 26, 1977

[54] LOW PROFILE ADDITIVES IN POLYESTER SYSTEMS

[75] Inventor: Willis T. Schwartz, Jr., Grand Island, N.Y.

[73] Assignee: Hooker Chemicals & Plastics Corporation, Niagara Falls, N.Y.

[21] Appl. No.: 665,752

[22] Filed: Mar. 11, 1976

[51] Int. Cl.² .............................................. C08L 67/06
[52] U.S. Cl. ................... 260/862; 260/40 R; 260/42.18; 260/42.53; 260/873; 526/15
[58] Field of Search ............... 260/862, 873, 40 R, 260/42.18, 42.53; 526/15

[56] References Cited

U.S. PATENT DOCUMENTS

| | | | |
|---|---|---|---|
| 3,413,379 | 11/1968 | Shade et al. | 260/860 |
| 3,446,778 | 5/1969 | Waller et al. | 260/75 |
| 3,466,348 | 9/1969 | Wiener | 260/860 |
| 3,528,939 | 9/1970 | Pratt et al. | 526/15 X |
| 3,598,882 | 8/1971 | Brinkmann et al. | 260/873 |
| 3,642,726 | 2/1972 | Heilman | 526/15 X |
| 3,660,339 | 5/1972 | Schuh | 526/15 X |
| 3,705,208 | 12/1972 | Nakamuta et al. | 260/873 X |
| 3,733,370 | 5/1973 | Thompson et al. | 260/862 |
| 3,741,943 | 6/1973 | Sekmakas | 526/15 X |
| 3,843,751 | 10/1974 | Reese et al. | 260/862 |
| 3,857,812 | 12/1974 | Nowak et al. | 260/40 R |
| 3,862,998 | 1/1975 | Koehler et al. | 260/873 |
| 3,880,950 | 4/1975 | Hara et al. | 260/862 |
| 3,883,612 | 5/1975 | Pratt et al. | 260/862 |
| 3,887,515 | 6/1975 | Pennington et al. | 260/862 X |
| 3,917,573 | 11/1975 | Parekh et al. | 526/15 |
| 3,925,328 | 12/1975 | Shibahara et al. | 526/15 |
| 3,947,422 | 3/1976 | Tatum et al. | 260/862 X |
| 3,956,421 | 5/1976 | Roberts et al. | 260/862 |
| 3,966,842 | 6/1976 | Ludwig et al. | 260/873 |
| 3,980,610 | 9/1976 | Conard | 260/40 R |
| 3,986,992 | 10/1976 | Canning et al. | 260/862 X |

Primary Examiner—John C. Bleutge
Assistant Examiner—T. DeBenedictis, Sr.
Attorney, Agent, or Firm—Peter F. Casella; James F. Mudd; William G. Gosz

[57] ABSTRACT

Polymerizable polyester compositions are provided containing a styrene-maleic anhydride copolymer reacted with a hydroxyl terminated saturated polyester. Such compositions have good thickening response and are free from tackiness in the uncured state, and upon curing have good shrinkage control and improved surface smoothness. The compositions are useful as bulk molding compounds or sheet molding compounds.

15 Claims, No Drawings

LOW PROFILE ADDITIVES IN POLYESTER SYSTEMS

BACKGROUND OF THE INVENTION

This invention relates to improved polyester molding compositions characterized by being tack free and by little or no tendency toward shrinkage during the curing thereof, and which when cured produce molded articles having superior surface smoothness; that is, "low profile", or little variation in surface smoothness. More particularly, it relates to polymerizable polyester compositions comprising a compatible mixture (1) an unsaturated polyester and an ethylenically unsaturated copolymerizable therewith, and (2) a styrene-maleic anhydride copolymer reacted with a hydroxyl or amine terminated saturated polyester.

It has long been known to prepare linear polyesters by the reaction of dihydric alcohols and ethylenically unsaturated dicarboxylic acids, and that such unsaturated polyesters are capable of addition polymerization with unsaturated monomers to form thermoset polymers. It is also known to admix such linear ethylenically unsaturated monomers, such as styrene, and to heat the resulting mixture, in the presence of a catalyst, such as a free radical generating substance, to effect copolymerization.

It has been suggested to add to the above mixture of unsaturated polyester and copolymerizable monomer, an unpolymerizable or saturated linear polyester, which mixture can then be polymerized or cured to a substantially infusible state to produce products of improved strength. Such polyester compositions are often reinforced with fillers, such as fiber glass, either in the form of rovings or mats, and the molded products prepared therefrom have found extensive application in industry, for example in floor panels for or portions of automotive bodies, for appliance shells, boat hulls, and the like. However, in the formation of shaped articles with such reinforced plastic compositon, difficulties arise because the fibers initially immersed within the uncured liquids tend to protrude from the surface causing the object, after molding and curing of the resin, to have irregularities on the surface. Moreover, when the compositions gel to form thermoset cured compositions shrinkage may occur, and the cured piece may develop very small cracks or "microcracks". Such shrinkage, microcracks, and surface irregularities are particularly undesirable where a molded article having a very smooth surface is required. Shrinkage results in the separation of the minute areas of the surface of the cured product from the mold surface, with the result that the surface exhibits poor gloss, minute irregularities or unevenness and is not of the desired smoothness. The molded article fails to accurately reproduce the dimensions and surface characteristics of the mold and results in either rejection of the piece or costly finishing operations, e.g., multiple sanding operations and the like. Such irregularities in surface smoothness are readily determined by a profile examination of the surface and hence molded articles having a truly smooth surface have been termed "low profile" moldings. Moreover, the polymerizable mixture can be difficult to handle, being sticky or tacky. Thus, when processed into preformed items such as prepregs, sheet molding compounds or extruded rods, the preformed items are difficult to handle and store due to the tacky nature of the materials.

Although attempts have been made to decrease the shrinkage which such polymerizable compositions undergo upon curings, for example by incorporating in such compositions thermoplastic additives such as poly(methyl methacrylate), poly(vinyl chloride), saturated polyesters having hydroxyl terminal groups and the like, such attempts have not been completely successful. Thus they have either failed to significantly reduce cure-shrinkage or they have imparted to the uncured product undesirably physical properties such as tackiness, mold scumming, exudation of the additive, and the like.

Moreover, many such compositions as indicated above are unsatisfactory for use in the recently developed sheet molding compound technique of molding reinforced plastic materials. In this development, the curable mixture is compressed or preformed between sheets of polyolefin, e.g., polyethylene or polypropylene film, and film stripped from the preformed sheets of the curable polyester compositions just prior to molding. In many instances, the polyolefin film cannot be removed cleanly from the polyester resin sheet due to the tacky nature of the latter which may result from the inclusion of the hydroxy terminated saturated polyesters. This is highly undesirable since it complicates the removal of the polyolefin film. Inasmuch as it is conventional to this art, to prepare the sheet and store or ship it before molding, this tacky or sticky conldition is obviously undesirable.

In addition, it is frequently necessary to use relatively large amounts of a high molecular weight additive to control shrinkage adequately which may exude to the surface of the part during molding giving undesireable properties such as poor paint adhesion and mold scumming.

Accordingly, it is an object of this invention to provide polyester compositions suitable for the preparation of the low profile molded articles which in the precured state are not tacky. It is a further object to provide low profile bulk molding compounds and sheet molding compounds which are not tacky and produce molded parts having good gloss.

Other objects and advantages of this invention will be apparent from the following description of the present invention.

SUMMARY OF THE INVENTION

In accordance with the present invention, it has now been found that new curable or polymerizable polyester compositions are obtained by admixing components comprising:
1. a polymerizable polyester component; and
2. a low profile additive component comprising the reaction product of a styrene-maleic anhyride copolymer having a molecular weight of from about 2,000 to 20,000, and a saturated polyester containing at least one terminal hydoxyl group and having a molecular weight of from about 1,500 to about 25,000, and an acid number of from about 2 to about 40, said low profile additive comprising from about 2 to about 20 parts by weight of said styrene-maleic anhydride copolymer per 100 parts by weight of said low profile additive.

The low profile additive component is present in the amount of at least about 5 parts by weight of said composition comprisng the polymerizable polyester component and the low profile additive component, preferably from about 5 to about 20 parts by weight.

It has further been found that such curable mixtures can be preformed, i.e. sheet molding compounds can be prepared therefrom, which are substantially non tacky. Moreover, such compositions can be cured in molds to provide molded articles having smooth surface characteristics.

The present invention may be considered in terms of the following aspects:

A. Novel low profile additives which may be incorporated into unsaturated polyester molding compositions to impart dimensional stability thereto;

B. unsaturated polyester molding compositions containing the novel low profile additives; and C. molded articles of manufacture prepared therefrom.

Although the unsaturated polyester molding compositions are described in terms of major components thereof, that is the unsaturated polyester component and the additive component, it will be appreciated that, in accordance with known practice, the molding composition may also include additional appropriate ingredients including, for example, fillers, lubricants, pigments, fire retardants, curing agents, reinforcing agents, mold release agents, and the like.

DESCRIPTION OF THE PREFERRED EMBODIMENTS

The polymerizable polyester component of the molding compositions of this invention comprises an unsaturated polyester and a copolymerizable monomer.

The unsaturated polyesters which may be employed include those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethyl-maleic, itaconic, citraconic, zeronic, pyrocinchoninic, mesaconic, aconitic and acetylene dicarboxylic, and the like either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like and mixtures thereof.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and the like and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and an saturated alcohol.

The temperature for the reaction between polyhydric alcohols and polybasic acids ranges from about one hundred to two hundred degrees centigrade, although higher temperatures can be used. Esterification catalysts such as para-toluene sulfonic acid, benzene sulfonic acid, beta-napthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

The aforementioned unsaturated polyesters are components thereof are intended to be illustrated of polyesters suitable for the compositions of this invention and are not intended to be all-inclusive. The molecular weight of the polymerizable unsaturated polyester is not critical and may vary over a wide range. Typically, the average molecular weight will be in a range from about 500 or less to about 10,000, or higher and preferably from about 700 to about 6000.

A variety of ethylenically unsaturated monomers can be used for curing or cross-linking the ethylenically unsaturated polyesters. The monomer is preferably liquid at reaction temperatures, has the ability to dissolve the unsaturated polyester and is coopolymerizable therewith to form a cross-linked structure. Suitable monomers are generally characterized by the presence of at least one reactive $H_2C=C<$ group per molecule. Specific examples of such monomers include styrene, chlorostyrenes, methyl styrenes such as alpha methyl styrene, p-methyl styrene, vinyl benzyl chloride, divinylbenzene, indene, fluorostyrene, unsaturated esters such as methyl acrylate, methyl methacrylate, as well as other lower aliphatic esters of acrylic and methacrylic acids, allyl acetate, diallyl phthalate, diallyl succinate, diallyl adipate, diallyl sebacate, diethylene glycol bis (allyl carbonate), trially phosphate and other allyl esters, and vinyl toluene, diallyl chlorendate, diallyl tetrachlorophthalate, ethylene glycol diacrylate, ethylene glycol dimethacrylate, ethylene glycol diethacrylate and the like and mixtures thereof.

The proportion of unsaturated monomer to unsaturated polyester can vary within the ultimate limits of each as necessary to produce an infusible, insoluble polyester resin. The amount of such monomer is generally within the range of from about 10 to about 65 percent, and preferably within the range of from about 20 to about 60 percent, by weight of the mixture of unsaturated polyester, monomer, and low profile additive.

Polymerization catalysts are preferably added to the mixture of unsaturated polyester and unsaturated monomer to efect setting or curing. Catalysts such as benzoyl peroxide, acetyl peroxide lauroze peroxide, methylethyl ketone peroxide, cumene hydroperoxide, and the like are satisfactory. Such catalysts are commonly used in proportions of about 0.01 to 10 weight percent of the resin, depending on the efficiency of their action and whether or not substances which inhibit polymerization are present in the mixture. The polymerization reaction can also be hastened by addition of promotors such as metals or metal salts, cobalt resinates, cobalt maleate, cobalt naphthenate, and the like, or amines, such as dibutylamine, or mercaptans such as dodecyl mercaptan. These are generally used in proportions similar to or smaller than that stated for the catalysts.

For convenience in handling and mixing, a portion of the monomer may be combined with the unsaturated polyester, to serve as a solvent therefor prior to the addition of the low profile additive or other compounding ingredients and the remainder of the monomer may then be added during the formulation of the molding compound. To prevent premature polymerization during the initial mixing of the unsaturated polyester and a portion of the monomer, a polymerization inhibitor is advantageously added to the mixture or to one of its components prior to mixing, especially if the polyester-monomer solution is to be stored or shipped to commerce prior to final compounding or molding and curing. Polymerization inhibitors are generally added in amounts of about 0.001 to 1 weight percent of the mixture. Among the inhibitors which may be advantageously employed to prevent premature polymerization of the mixtures of unsaturated polyester and monomer are substances such as hydroquinone, benzoquinone, para-tertiarybutyl catechol, paraphenylene diamine, trinitrobenzene, picric acid and the like.

The additive component of the present invention comprises a styrene-maleic anhydride copolymer reacted with a hydroxyl or amine group terminated saturated polyester.

The styrene-maleic anhydride copolymer employed is a thermoplastic polymer which is commonly known in the art and is commercially available. The copolymer can vary in molecular weight over a wide range and in the proportions of styrene and maleic anhydride which comprise it.

Generally, a styrene-maleic anhydride copolymer can be prepared by reacting maleic anhydride with styrene at elevated temperatures, preferably in the presence of a peroxide catalyst. See, for example, U.S. Pat. No. 2,971,939, which is incorporated herein by reference.

The molar ratio of styrene to maleic anhydride present in the polymer can vary over a wide range. It is preferred to utilize styrene-maleic anhydride copolymers wherein the molar ratio of styrene to maleic anhydride is on the order of about 1:1. 2:1, or 3:1, respectively. However, it should be understood that the copolymer can contain somewhat lower amounts of the styrene or higher amounts thereof. Furthermore, it should be understood that when the term "styrene-maleic anhydride copolymer" is used herein and in the claims, it includes within its meaning copolymers that contain substituents on the benzene ring or the alkenyl portions of the styrene, and also polymers which in the polymeric chain contain small amounts of other materials such as, for example, alpha-methyl styrene. It should also be appreciated that mixtures of different styrene-maleic anhydride copolymers may be used in the compositions within the scope of the invention.

The styrene-maleic anhydride copolymer should have a molecular weight within the preferred range of from about 2,000 to about 20,000. Preferably, the styrene-maleic anhydride copolymer comprises from about 2 parts by weight to about 20 parts by weight per 100 parts by weight of additive.

The saturated polyester component of the low profile additive of this invention is prepared in the conventional manner by initially reacting approximately one molar equivalent of a dicarboxylic acid with approximately one molar equivalent of a polyol. The condensation is continued until a substantially complete reaction is obtained, as indicated by the acid number of the reaction mass of the polyester, the initially prepared polyester having at least one terminal hydroxyl group.

The polyester can be reacted with sufficient additional polycarboxylic acid or anhydride, which may be the same or different polycarboxylic acid as used previously until an acid number within the range of from about 2 to about 40, depending on the desired molecular weight, is obtained. The preferred molecular weight is within a range of from about 1,500 to about 25,000.

As typical of the diols, aliphatic and aromatic, which can be used to prepare the saturated polyester component of the invention the following are mentioned by way of examples:

ethylene glycol
propanediol-1,2
propanediol-1,3
butanediol-1,4
hexanediol-1,6
diethylene glycol
dipropylene glycol and higher homologues thereof
neopentyl glycol
2,2,4-trimethylpentanediol
oxyalkylated bisphenols, such as oxyethylated bisphenol A
dimethylol cyclohexane The diols generally have 2 to about 25 carbon atoms, preferably 2 to about 8 carbon atoms. Mixtures of these and equivalent diols are contemplated also. Further a diol as exemplified above in admixture with minor amounts, less than about 20 percent by weight of a polyol, such as glycerin, trimethylolpropane, pentaerythritol and the like, can be used also.

The dicarboxylic acids or anhydrides suitable for the preparation of the saturated components following by way of illustration.

oxalic acid
succinic acid
glutaric acid
adipic acid
pimelic acid
suberic acid
azelaic acid
sebacic acid
o-phthalic acid
isophthalic acid
terephthalic acid
tetrahydrophthalic acid
hexahydrophthalic acid
tetrachlorophthalic acid
tetrabromophthalic acid
endomethylene tetrahydrophthalic acid ("Methyl Nadic Acid")

hexachloroendomethylene tetrahydrophthalic acid, also known as "chlorendic acid" and similar compounds disclosed in U.S. pat. No. 2,779,701, which is incorporated herein by reference.

The corresponding anhydrides, acid halides or acid esters of the foregoing acids can also be used, e.g., isophthaloyl chloride, terephthaloyl chloride, dimethyl glutarate, dimethyl adipate, dimethyl terephthalate and the like, to form the same compositions.

The carboxylic acids generally have 2 to about 20 carbon atoms, preferably 4 to about 12 carbon atoms. Mixtures of these and equivalent dicarboxylic acids are contemplated also. Where available, the anhydrides or acid halides of these and equivalent dicarboxylic acids can also be used.

The saturated polyester is then reacted with the styrene-maleic anhydride copolymer to form the novel low profile additives of this invention The procedure is described in Examples 1 through 4.

It has been found that the low profile additives of this invention, when used in admixture with the polymerizable polyester, provide superior molding compositions which are non-tacky and exhibit increased thickening response in the uncured state, and provide molded articles which exhibit superior surface smoothness, improved hardness, and low shrinkage to provide low profile articles.

Preferably, and especially when the compositions of this invention are to be used for the preparation of sheet moldings compounds, a thickening agent is included. Preferred thickening agents are inorganic compounds known in this art and typical examples include magnesium oxide, calcium oxide, calcium hydroxide, magnesium hydroxide, basic magnesium carbonate and mixtures thereof. Only relatively small amounts of these agents are used, for example from about one half to about 15 parts by weight and preferably from 1 to about 7 parts by weight based on the weight of the mixture of polyester, monomer, and additive. Greater or lesser amounts may be used depending upon the degree of thickening desired.

The polymerizable composition prepared in accordance with this invention contains additional components which are generally conventional in the art of reinforced plastics. Thus, fillers such as hydrated aluminum oxide, talcum, clays, chalk, asbestos powder and fibers, quartz powder, kieselguhr, and the like, mold lubricants or mold release agents such as calcium and zinc stearate, silicones, and the like, reinforcing materials such as glass fibers, threads and mats, metal fibers, and the like and various mixtures thereof are incorporated by known means in the mixture.

Thus the mixture of unsaturated polyester, low profile additive, copolymerizable monomer, thickening agent, filler, mold lubricant and catalyst is blended in suitable apparatus, such as a Cowles Dispersator. The resultant liquid mixture is applied by means of a doctor blade to two sheets of polyethylene film and the glass fibers are uniformly deposited on the resin mixture of one of the films and covered with the resin coated side of the other film. After covering the mass, the polyethylene film sandwich is squeezed between corrugated rolls so as to wet the glass fibers with the resin mixture followed by squeezing between smooth rolls. The resultant sheet molding composition is then rolled on a fiber board core and sealed with aluminum foil backed cellophane film to prevent loss by evaporation of the monomer. After aging for a sufficient period, e.g., about two or more days at ambient temperature or above, to permit thickening of the mass, the resulting sheet molding compound ca be cut into pieces of desired size, the polyethylene film peeled off and molded in a compression press in a known manner.

After mixing in a premix mixer, the filled reinforced mixture can be molded directly in a suitable press as a "bulk molding compound". If desired, the molding composition can be extruded through a suitable die as a rod, the extruded rod may be cut into pellets or chips of a desired size and the pellets or chips transferred to a suitable molding press and heated therein under compression to cure the compositions.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

Preparation of Unsaturated Polyester

A mixture of 790 parts (10.4 mols) of propylene glycol, 882 parts (9.0 mols) of maleic anhydride and 148 parts (1.0 mol) of phthalic anhydride was heated to and maintained at 200° -- 210° while agitating the mixture and while passing a slow steady stream of nitrogen gas through the mixture. After about 170 parts of water had distilled from the reaction mixture and the acid number of the mass had fallen to 30 to 35, the heating was discontinued. Following the addition of 0.48 part of toluhydroquinone, the polyester mass was cooled to about 120° and 810 arts (7.8 mols) of styrenee were dissolved in the mass. The resulting solution had a Brookfield viscosity of 790 cps at 25°.

EXAMPLE 2

Preparation of Saturated Polyester

A 1 liter resin kettle fitted with stirrer, thermometer and nitrogen purge was charged with 760 grams (approximately 0.1 mole) of a saturated polyester prepared from 0.6 moles of ethylene glycol, 0.4 moles of 1,4 butane diol, and 1.0 mole of adipic acid with an acid number of 0.2 and a hydroxyl number of 20.7. The flask was heated to 120° centigrade in an oil bath under a slow nitrogen purge at which time 10 grams (0.1 mole) of succinic anhydride was added and the composition heated at 120° centigrade for about 20 hours. Final acid number was 8.1.

Examples 3–5 illustrate the preparation of the novel low profile additives of this invention.

EXAMPLE 3

77 grams of the composition of Example 2, and 4.1 grams of a styrene-maleic anhydride copolymer (styrene/maleic anhydride molar ratio of 3:1), having an average molecular weight of 5500 and an acid numbr of 278, were charged to a 300 milliliter resin flask equipped with a stirrer. The flask was heated to 120° centigrade in an oil bath with a nitrogen purge for about 20 hours. The flask was cooled to 60° centigrade and 157.0 grams of styrene and 0.02 grams of toluhydroquinone were added. Final acid number was 13.4.

EXAMPLE 4

Following the procedure of Example 3, 77 grams of the composition of Example 2 and 3.2 of a styrene maleic anhydride copolymer (styrene/maleic anhydride molar ratio of 2:1), having an average molecular weight of 4200 and an acid number of 342, were reacted. The final acid number was 13.9. To the resulting composition was added 154 grams of styrene and 0.02 grams of toluhydroquinone.

EXAMPLE 5

Following the procedure of Example 3, 77 grams of the composition of Example 2 and 2.2 grams of a styrene-maleic anhydride copolymer (styrene/maleic anhydride ratio of 1:1), having an average molecular weight of 3100 and an acid number of 417, were reacted to a final acid number of 18.9. This product was dissolved in 149 grams of styrene containing 0.02 grams of toluhydroquinone.

EXAMPLE 6

Preparation of Bulk Molding Compound 101.3 parts of the composition of Example 1, 27.8 parts of the composition of Example 3, 55.5 parts of styrene, 1.85 parts of T-butyl perbenzoate, 5.6 parts of zinc stearate, 369 parts of camelwite, and 2.67 parts of $Mg(OH)_2$ were compounded with a Cowles type stirrer on a drill press at medium high speed. To the resultant mixture was added 141 parts of ¼ inch chopped glass fiber and mixed with a single curve blade premix mixer.

The resulting bulk molding compound was then spread out in a polyethylene film tube 5 inches in diameter and passed repeatedly between rollers until a sheet molding compound of nominal ⅛ inch thickness was obtained.

The sheet molding compound was then rolled up, wrapped with aluminum-clad polyethylene, and sealed in a paint can before maturing in a 100° F oven until molded.

The polyethylene film was stripped from the molding material. The composition pealed cleanly and exhibited no tackiness. A 320 gram portion of the compound was charged to an 8 inch by 8 inch polished mold containing parallel ⅜ inch and ¼ inch ribs. The mass was compression molded for 2 minutes at 300° F and 1000 p.s.i.

The resulting molded piece had the following properites:

| | | |
|---|---|---|
| Shrinkage (average) | | |
| Parallel to rib | −0.75 | mils/in. (expansion) |
| Perpendicular to rib | −1.32 | mils/in. (expansion) |
| Profile (average) | | |
| Center | 101 | micro inches/½ inch |
| Over ⅜" rib | 125 | micro inches/½ inch |
| Barcol Hardness (average) | 30 | |

The composition had good peel and no tackiness.

EXAMPLE 7

The procedure of Example 6 was repeated substituting the composition of Example 4 for the composition of Example 3. The uncured composition had good peel and no tackiness.

The resultant molded article had the following properties:

| | | |
|---|---|---|
| Shrinkage (average) | | |
| Parallel to rib | −0.82 | mils/in. (expansion) |
| Perpendicular to rib | −1.07 | mils/in. (expansion) |
| Profile (average) | | |
| Center | 81 | micro inches/½ inch |
| Over ⅜" rib | 163 | micro inches/½ inch |
| Barcol Hardness (average) | 25 | |

EXAMPLE 8

The procedure of Example 6 was repeated substituting the composition of Example 5 for the composition of Example 3.

The resultant molded article had the following properties:

| | | |
|---|---|---|
| Shrinkage (average) | | |
| Parallel to rib | −1.00 | mils/in. (expansion) |
| Perpendicular to rib | −1.19 | mils/in. (expansion) |
| Profile (average) | | |
| Center | 135 | micro inches/½ inch |
| Over ⅜" rib | 157 | micro inches/½ inch |
| Barcol Hardness (average) | 30 | |

The uncured composition had good peel and faint thickness.

The foregoing embodiments are intended to illustrate the invention but not to limit it. Various modifications can be made in the invention without departing from the spirit and scope thereof.

What is claimed is:
1. A polymerizable molding composition comprising
   1. a polymerizable polyester compontent comprising an unsaturated polyester and a copolymerizable unsaturated monomer; and
   2. an additive component comprising the reaction product of a styrene-maleic anhydride copolymer, and a saturated polyester, said saturated polyester generally being terminated with at least one hydroxyl group.
2. The molding composition of claim 1 wherein the styrene-maleic anhydride copolymer is present in the amount of from about 2 to about 20 parts by weight per 100 parts by weight of additive.
3. The molding composition of claim 1 wherein the saturated polyester has a molecular weight of from about 1,500 to about 25,000, and an acid number of from about 2 to about 40.
4. The molding composition of claim 2 including a copolymerizable unsaturated monomer present in an amount of from about 20 to about 60 parts by weight per 100 parts by weight of the mixture of polymerizable polyester and additive.
5. The molding composition of claim 1 wherein the molding composition also comprises a thickening agent.
6. The molding composition of claim 5 wherein the thickening agent is an inorganic material selected from the group consisting of magnesium oxide, magnesium hydroxide, basic magnesium carbonate, calcium hydroxide, and mixtures thereof.
7. The molding composition of claim 1 wherein the saturated polyester is obtained by reacting initially a diol with a dicarboxylic acid, anhydride, acid halide or diester to form a polyester having at least one terminal hydroxyl group.
8. The molding composition of claim 8 wherein the polyester initially formed is the product of reaction of a mixture of ethylene glycol and 1,4-butane diol with adipic acid.

9. The molding composition of claim 7 wherein the polyester initially formed is subsequently reacted with succinic anhydride.

10. The molding composition of claim 9 wherein the polyester initially formed and the succinic anhydride are present in approximately equimolar amounts.

11. The molding composition of claim 1 wherein the styrene-maleic anhydride copolymer has a styrene/maleic anhydride molar ratio of about 1:1.

12. The molding composition of claim 1 wherein the styrene-maleic anydride copolymer has a styrene/maleic anhydride molar of about 2:1.

13. The molding composition of claim 1 wherein the styrene-maleic anhydride copolymer has a styrene/maleic anhydride molar ratio of about 3:1.

14. A thickened non-tacky sheet molding compound comprising a polymerizable molding composition as defined in claim 1, including a filler, a thickening agent, a polymerization catalyst and reinforcing glass fibers.

15. A thickened non-tacky sheet molding compound comprising a polymerizable molding composition as defined in claim 1, including a filler, a polymerization catalyst and reinforcing glass fibers.

* * * * *

UNITED STATES PATENT AND TRADEMARK OFFICE
CERTIFICATE OF CORRECTION

PATENT NO. : 4,038,342
DATED : July 26, 1977
INVENTOR(S) : Willis T. Schwartz, Jr.

It is certified that error appears in the above-identified patent and that said Letters Patent are hereby corrected as shown below:

At Column 1, line 42, for "uncured liquids tend" read "uncured liquid resin tend".

At Column 1, line 63, for "the polymerizable mixture" read "the polymerizable polyester mixture".

At Column 2, line 57 for "to 20,000" read "to about 20,000".

At Column 2, line 58 for "hydoxyl" read "hydroxyl".

At Column 4, line 41 for "coopolymerizable" read "copolymerizable".

At Column 4, line 61 for "amount of such monomer is generally" read "amount of such monomer used is generally".

At Column 6, line 49 and 50, for "components following by way of" read "components of the composition of this invention include the following".

UNITED STATES PATENT AND TRADEMARK OFFICE
CERTIFICATE OF CORRECTION

PATENT NO. : 4,038,342
DATED : July 26, 1977
INVENTOR(S) : Willis T. Schwartz, Jr.

It is certified that error appears in the above-identified patent and that said Letters Patent are hereby corrected as shown below:

At Column 6, lines 66, 67 and 68 for

"tetrabromophthalic acid endomethylene tetrahydrophthalic acid
    ("Methyl Nadic Acid")"

read

"tetrabromophthalic acid endomethylene tetrahydrophthalic acid
    ("Nadic Acid")

methyl endomethyl tetrahydrophthalic acid
    ("Methyl Nadic Acid")".

At Column 8, line 37 for "810 arts (7.8 mols) of styrenee" read "810 parts (7.8 mols) of styrene".

At Column 10, line 26 for "thickness" read "tackiness".

At Column 10, line 67, Claim 8, for "The molding composition of Claim 8" read "The molding composition of Claim 7".

Signed and Sealed this

Twenty-fifth Day of April 1978

[SEAL]

Attest:

RUTH C. MASON
Attesting Officer

LUTRELLE F. PARKER
Acting Commissioner of Patents and Trademarks